United States Patent
Kim et al.

(10) Patent No.: US 10,938,033 B2
(45) Date of Patent: Mar. 2, 2021

(54) NEGATIVE ELECTRODE ACTIVE MATERIAL AND SECONDARY BATTERY COMPRISING SAME

(71) Applicant: LG Chem, Ltd., Seoul (KR)

(72) Inventors: Hyun-Wook Kim, Daejeon (KR); Jong-Hun Kim, Daejeon (KR); Jang-Hyuk Hong, Daejeon (KR)

(73) Assignee: LG Chem, Ltd.

( * ) Notice: Subject to any disclaimer, the term of this patent is extended or adjusted under 35 U.S.C. 154(b) by 312 days.

(21) Appl. No.: 15/753,606

(22) PCT Filed: Feb. 6, 2017

(86) PCT No.: PCT/KR2017/001300
§ 371 (c)(1),
(2) Date: Feb. 20, 2018

(87) PCT Pub. No.: WO2017/135794
PCT Pub. Date: Aug. 10, 2017

(65) Prior Publication Data
US 2020/0127289 A1    Apr. 23, 2020

(30) Foreign Application Priority Data
Feb. 5, 2016 (KR) .......... 10-2016-0015158

(51) Int. Cl.
*H01M 4/00* (2006.01)
*H01M 4/587* (2010.01)
(Continued)

(52) U.S. Cl.
CPC .......... *H01M 4/587* (2013.01); *H01M 4/364* (2013.01); *H01M 4/366* (2013.01); *H01M 4/625* (2013.01);
(Continued)

(58) Field of Classification Search
CPC ... H01M 4/628; H01M 10/0525; H01M 4/366
See application file for complete search history.

(56) References Cited

U.S. PATENT DOCUMENTS

2009/0098448 A1    4/2009  Ozaki et al.
2012/0148922 A1*   6/2012  Takahashi ............. H01M 4/133
                                                    429/231.8
(Continued)

FOREIGN PATENT DOCUMENTS

EP    2667436 A1    11/2013
JP   2001250557 A    9/2001
(Continued)

OTHER PUBLICATIONS

Search report from International Application No. PCT/KR2017/001300, dated May 24, 2017.
(Continued)

*Primary Examiner* — Cynthia H Kelly
*Assistant Examiner* — Monique M Wills
(74) *Attorney, Agent, or Firm* — Lerner, David, Littenberg, Krumholz & Mentlik, LLP

(57) ABSTRACT

Disclosed is a negative electrode active material including artificial graphite having a large particle diameter and natural graphite having a small particle diameter, wherein the average particle diameter ratio of the small particle and the large particle is 1:1.5-1:5. A secondary battery including the negative electrode active material is also disclosed.

7 Claims, 3 Drawing Sheets

(51) Int. Cl.
    *H01M 4/36* (2006.01)
    *H01M 4/62* (2006.01)
    *H01M 10/0525* (2010.01)
    *H01M 4/02* (2006.01)

(52) U.S. Cl.
    CPC .. *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2014/0027679 A1 | 1/2014 | Kim et al. |
| 2015/0364794 A1* | 12/2015 | Nakazawa ........ H01M 10/0525 429/200 |
| 2016/0181612 A1 | 6/2016 | Lee et al. |
| 2016/0276657 A1 | 9/2016 | Song et al. |
| 2017/0179487 A1 | 6/2017 | Takeda et al. |
| 2017/0187064 A1 | 6/2017 | Takeda et al. |

FOREIGN PATENT DOCUMENTS

| | | |
|---|---|---|
| JP | 2010073618 A | 4/2010 |
| KR | 20090094575 A | 9/2009 |
| KR | 20110069458 A | 6/2011 |
| KR | 20140099988 A | 8/2014 |
| KR | 20150073107 A | 6/2015 |
| WO | 2014010973 A1 | 1/2014 |
| WO | 2015152113 A1 | 10/2015 |
| WO | 2015152115 A1 | 10/2015 |
| WO | 2016018023 A1 | 2/2016 |

OTHER PUBLICATIONS

Masafumi Arakawa "Instruction to Partide Size Measurement", Journal of the Society of Powder Engineering, vol. 17, No. 6, Jun. 10, 1980, pp. 299-307. (Partial translation attached).

* cited by examiner

NEGATIVE ELECTRODE ACTIVE MATERIAL AND SECONDARY BATTERY COMPRISING SAME

CROSS-REFERENCE TO RELATED APPLICATIONS

This application is a national phase entry under 35 U.S.C. § 371 of International Application No. PCT/KR2017/001300 filed Feb. 6, 2017, which claims priority to Korean Patent Application No. 10-2016-0015158 filed on Feb. 5, 2016, the disclosures of which are incorporated herein by reference.

TECHNICAL FIELD

The present disclosure relates to a negative electrode active material and a secondary battery including the same. More particularly, the present disclosure relates to a negative electrode active material having improved life characteristics and a secondary battery including the same.

BACKGROUND ART

Factors affecting the life characteristics of a battery may be classified into intrinsic property factors of materials and designing factors. The intrinsic property factors include intrinsic properties of the key materials (positive electrode, negative electrode, separator and electrolyte) forming a battery, while the designing factors are related with designing of battery cells, particularly including a design balance between a positive electrode and a negative electrode.

When a battery undergoes degradation in life characteristics due to the key materials forming the battery, it is not possible to recover the life characteristics. As the temperature of a battery is increased, deterioration of materials is accelerated, resulting in more rapid degradation of life characteristics. In this case, fundamental properties of materials should be improved. On the other hand, most of degradation of the life characteristics of a battery caused by designing factors occurs due to a thermodynamic or electrochemical unbalance between a positive electrode and a negative electrode. Actually, for example, even when a battery is designed by selecting a high-quality positive electrode and a high-quality negative electrode, the battery does not always shows high performance. In addition, even when a low-quality positive electrode and a low-quality negative electrode are used, life characteristics are not always poor. In other words, designing of a battery should consider various factors which are largely determined by experience. This is why designing of a battery is considered to be difficult.

Particularly, in the case of a negative electrode, it undergoes rapid shrinking/expansion during charge/discharge, and thus it is always subjected to kinetic conditions. When applying graphite to design a lithium secondary battery, a degree of volumetric expansion caused by a structural change of graphite depending on a charging degree should be considered. If not, distortion of an electrode may occur due to the expansion of a negative electrode during charge, resulting in significant degradation of the life and performance of a battery.

However, natural graphite used currently as a negative electrode active material requires consumption of a large amount of surface coating-forming agent. Since the amount of accessible lithium ions per unit area is increased as the capacity is increased, rate characteristics are degraded relatively and life characteristics are poor due to large volumetric expansion during charge/discharge.

In addition, artificial graphite has no pores therein while it is graphitized through powder graphitization, and thus shows poor rolling characteristics during the manufacture of an electrode. Also, artificial graphite has a small surface area to increase the charge transfer resistance of lithium ions, and provides poor output characteristics.

Therefore, although a method for manufacturing an electrode by blending natural graphite with artificial graphite has been developed, their kinetic properties are different to provide unbalanced kinetic properties in a negative electrode of a battery and they cannot provide any synergic effect. Thus, there is still a need for technical development.

DISCLOSURE

Technical Problem

The present disclosure is designed to solve the problems of the related art, and therefore the present disclosure is directed to providing a negative electrode active material which shows a kinetic balance and provides improved life characteristics, and a secondary battery including the same.

Technical Solution

In one aspect of the present disclosure, there is provided a negative electrode active material according to any one of the following embodiments.

According to Embodiment 1 of the present disclosure, there is provided a negative electrode active material which includes artificial graphite having a large particle diameter and natural graphite having a small particle diameter, wherein the average particle diameter ratio of the small particle and the large particle is 1:1.5-1:5; each of the artificial graphite having a large particle diameter and the natural graphite having a small particle diameter is further provided with a coating layer containing amorphous carbon; the coating layer is present in an amount of 1-10 parts by weight based on 100 parts by weight of the sum of the artificial graphite having a large particle diameter and the natural graphite having a small particle diameter; and the content ratio of the artificial graphite having a large particle diameter and the natural graphite having a small particle diameter is 1:9-4:6.

According to Embodiment 2, there is provided the negative electrode active material of Embodiment 1, wherein the artificial graphite has an average particle diameter of 18-30 µm.

According to Embodiment 3, there is provided the negative electrode active material of Embodiment 1 or 2, wherein the natural graphite has an average particle diameter of 5-13 µm.

In another aspect of the present disclosure, there is also provided a negative electrode according to any one of the following embodiments.

According to Embodiment 4, there is provided a negative electrode including a current collector, and a negative electrode active material layer formed on at least one surface of the current collector and including the negative electrode active material as defined in any one of Embodiments 1 to 3.

According to Embodiment 5, there is provided the negative electrode of Embodiment 4, wherein the negative electrode active material layer further includes at least one of a binder, conductive material and a dispersant.

According to Embodiment 6, there is provided there is provided the negative electrode of Embodiment 4 or 5, wherein the negative electrode active material layer has a packing density of 1-2.

In still another aspect of the present disclosure, there is provided a secondary battery according to any one of the following embodiments.

According to Embodiment 7, there is provided a secondary battery including a positive electrode, the negative electrode as defined in any one of Embodiments 4 to 6, and a separator interposed between the positive electrode and the negative electrode.

According to Embodiment 8, there is provided the secondary battery of Embodiment 7, which is a lithium secondary battery.

Advantageous Effects

The negative electrode active material according to the present disclosure comprises artificial graphite having a large particle diameter and natural graphite having a small particle diameter, which satisfy kinetically balance, in an optimized mixing ratio to provide advantages in that the charge transfer resistance and liquid diffusion resistance are reduced and the high-rate charging performance is improved. In addition, such reduced resistance advantageously provides improved life characteristics.

In addition, since natural graphite of a small particle diameter having excellent rolling quality is used with artificial graphite having a large particle diameter, by improving the rolling quality of the negative electrode active material, a secondary battery having high capacity can be obtained.

Further, since the artificial graphite having a large particle diameter and the natural graphite having a small particle diameter are coated with amorphous carbon on the surface thereof, it is possible to inhibit exfoliation caused by an electrolyte, thereby providing improved output at low temperature.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Figure 1:
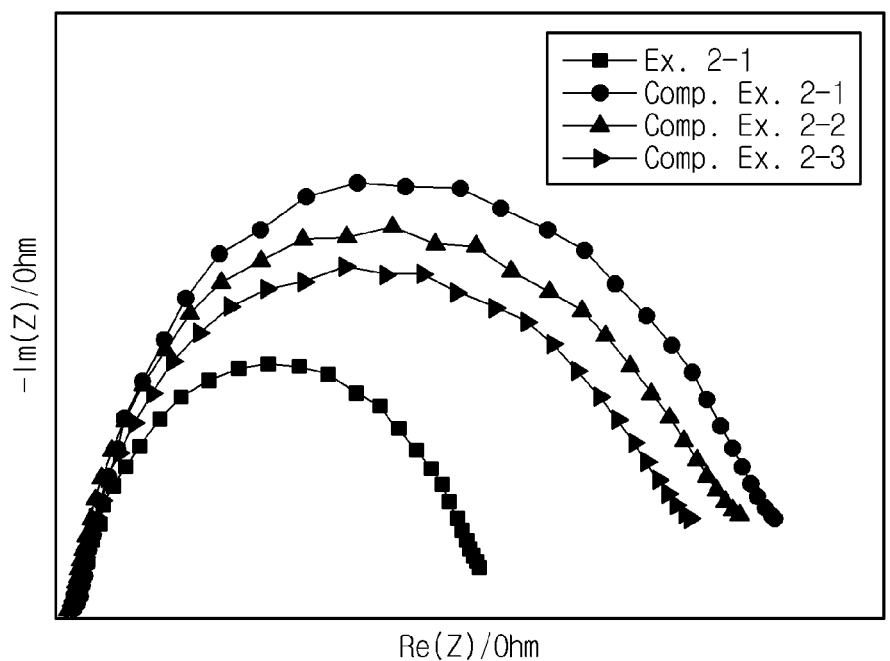
FIG. 1 is a graph illustrating the results of comparison of charge transfer resistance in Example 2-1 with Comparative Examples 2-1 to 2-3.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The negative electrode active material according to the present disclosure includes artificial graphite having a large particle diameter and natural graphite having a small particle diameter.

Graphite crystals are obtained by formation of graphene layers through the binding of hexagonal planes of carbon atoms of $sd^2$-hybrid orbitals with each other, and by binding of those graphene layers through the π electrons positioned on the top and bottom of the graphene layers. Since the π electrons can move relatively freely between graphene layers, graphite shows high electron conductivity. Although the π bonding by which graphite layers are bound with each other forms weak Van der Waals bonding, the binding inside of the graphene layers is made by significantly strong covalent bonding, thereby showing anisotropy, and lithium ions are intercalated between the graphite layers and deintercalated therefrom.

Such graphite includes natural graphite occurring naturally and mined from the nature and artificial (synthetic, pyrolytic) graphite obtained by carbonization of coal-based and petroleum-based pitch or the like at 2,500° C. or higher.

Artificial graphite that may be used in an embodiment of the present disclosure is not particularly limited, as long as it is one obtained by the conventional manner in the art. Non-limiting examples of such artificial graphite include one obtained by baking mesophase carbon microbeads (MCMB) or mosaic cokes at 2,800-3,000° C.

In addition, natural graphite that may be used in the negative electrode active material according to the present disclosure is not particularly limited, as long as it is natural graphite used conventionally in the art. Such natural graphite may be used, after it is subjected to post-treatment processing, such as spheroidizing, so that it may have a smooth surface shape in order to reduce irreversible reactions and to improve the processability of an electrode.

Herein, the negative electrode active material according to the present disclosure includes artificial graphite having a large particle diameter in combination with natural graphite having a small particle diameter to obtain a kinetic balance.

As used herein, 'kinetic balance' means a balance of resistance generated at the interface and inside of particles during intercalation/deintercalation of lithium ions. Natural graphite having small particles shows a decrease in charge transfer resistance, while mosaic-type artificial graphite having large particles is isotropic in terms of orientation at the edges of crystal surfaces, and thus shows a decrease in charge transfer resistance. In this manner, it is possible to realize a kinetic balance.

Referring to solid diffusion resistance in particles, natural graphite having small particles shows a small crystal length and a decrease in resistance. In addition, artificial graphite shows a decrease in resistance, because isotropically grown crystals are shorter than anisotropically grown crystals. In this manner, it is possible to realize a kinetic balance.

According to the related art, artificial graphite cannot be obtained through a spheroidizing process, and thus its shape is not round. Therefore, when manufacturing an electrode by using artificial graphite having a large particle diameter alone, a large amount of binder (carboxymethyl cellulose (CMC), styrene butadiene rubber (SBR), etc.) is consumed. This functions as resistance in a battery, thereby causing a problem of degradation of battery performance. On the other hand, when using spheroidized natural graphite having a small particle diameter alone, it has a large specific surface area due to such small particles to cause an increase in surface side reactions, thereby causing degradation of battery performance, particularly in terms of cycle life characteristics.

Herein, the average ratio of small particle diameter and large particle diameter is 1:1.5-1:5, preferably 1:2-1:4, and more preferably 1:2-1:3. When the above-defined average particle diameter ratio is not satisfied, lithium metal may be deposited on the surface of a negative electrode during charging at high current since a kinetic balance cannot be realized, thereby causing rapid degradation of the performance of a cell.

More particularly, the artificial graphite that may be used according to the present disclosure may have an average particle diameter of 18-30 µm, preferably 20-25 µm, and more preferably 23 µm. When the average particle diameter of the artificial graphite exceeds 30 µm, charge transfer resistance is increased significantly, resulting in degradation of the output characteristics of a cell. When the average particle diameter of the artificial graphite is less than 18 µm, the battery shows a decrease in energy density due to low initial efficiency and decreased capacity.

Further, the natural graphite that may be used according to the present disclosure may have an average particle diameter of 5-13 µm, preferably 8-11 µm. Similar to the artificial graphite, when the average particle diameter of the natural graphite exceeds 13 µm, charge transfer resistance is increased significantly, resulting in degradation of the output characteristics of a cell. When the average particle diameter of the natural graphite is less than 5 µm, the battery shows a decrease in energy density due to low initial efficiency and decreased capacity.

In addition, the artificial graphite having a large particle diameter and the natural graphite having a small particle diameter are used in combination at a ratio of 1:9-4:6, preferably at a weight ratio of 2:8-3:7. When the above-defined range is not satisfied, lithium metal may be deposited on the surface of a negative electrode during charging at high current since a kinetic balance cannot be realized, thereby causing rapid degradation of the performance of a cell.

In the negative electrode active material according to the present disclosure, each of the artificial graphite having a large particle diameter and the natural graphite having a small particle diameter is further provided with a coating layer containing amorphous carbon.

Conventionally, propylene carbonate (PC) has been added to an electrolyte to improve the output of a battery at low-temperature. However, such propylene carbonate (PC) forms lithium ion clusters, and shows high energy barrier of desolvation when lithium ions are transported and intercalated to graphite. Thus, in this case, intercalation of lithium ions to graphite in a cluster form causes a problem of exfoliation.

However, when using a coating layer containing amorphous carbon on the surface of artificial graphite and natural graphite according to the present disclosure, it is possible to adsorb lithium ions and thus to solve the problem of the related art. In addition, in this case, solid-state diffusion quality is improved, thereby providing improved high-rate charging performance.

Herein, the coating layer containing amorphous carbon is present in an amount of 1-10 parts by weight, preferably 2-8 parts by weight, and more preferably 3-5 parts by weight, based on 100 parts by weight of the sum of the artificial graphite having a large particle diameter and natural graphite having a small particle diameter. When the amount of the coating layer is less than 1 part by weight, exfoliation occurs due to an electrolyte. In addition, in the case of natural graphite, it undergoes an increase in specific surface area and the functional groups in the edge sides thereof react with an electrolyte to cause a decrease in initial efficiency. On the contrary, when the amount of the coating layer exceeds 10 parts by weight, the coating layer on the particle surface causes low initial efficiency and the discharge capacity per unit weight is decreased, resulting in degradation of the capacity of a battery. Further, the coating layer containing amorphous carbon is so hard that rolling property may be degraded undesirably.

In another aspect, there is provided a negative electrode including a current collector and a negative electrode active material layer containing the above-described negative electrode active material and formed on one surface of the current collector.

The negative electrode active material according to the present disclosure may be used to manufacture a negative electrode by the method used conventionally in the art. According to a non-limiting example of the method, the above-described negative electrode active material is mixed and agitated with a binder and a solvent, optionally with a conductive material and a dispersant, to obtain slurry, which, in turn, is applied onto either surface or both surfaces of the current collector, and then is compressed to provide a negative electrode.

The current collector is not particularly limited, as long as it is used conventionally in the art. Non-limiting examples of the current collector may include copper; stainless steel; aluminum; nickel; titanium; baked carbon; copper; stainless steel surface-treated with carbon, nickel, titanium or silver; aluminum-cadmium alloy; or the like.

The binder is not particularly limited, as long as it assists binding of an active material with a conductive material and binding to a current collector. Preferably, the binder is at least one selected from the group consisting of polyvinylidene fluoride, polyvinylidene fluoride-co-hexafluoropropylene (PVDF-co-HFP), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like. In general, the binder may be added in an amount of 1-20 wt % based on the total weight of the mixture containing the electrode active material.

Non-limiting examples of the solvent include acetone, tetrahydrofuran, methylene chloride, chloroform, dimethyl formamide, N-methyl-2-pyrrolidone (NMP), cyclohexane, water or a mixture thereof. The above-mentioned solvents provide an adequate level of viscosity so that a slurry coating layer may be formed to a desired level to the surface of the current collector.

The conductive material is not particularly limited, as long as it has conductivity while not causing any chemical change. Non-limiting examples of the conductive material include carbon black-based compounds, such as carbon black, acetylene black, ketjen black, channel black, furnace black, lamp black or thermal black; conductive fibers, such as carbon fibers or metal fibers; metal powder, such as fluorocarbon, aluminum or nickel powder; conductive whiskers, such as zinc oxide or potassium titanate; conductive metal oxide, such as titanium oxide; conductive materials, such as polyphenylene derivatives; or the like. In general, such a conductive material may be added in an amount of 1-20 wt % based on the total weight of the mixture containing the mixed electrode active material.

In addition, the dispersant may include N-methyl-2-pyrrolidone, diacetone alcohol, dimethyl formaldehyde, propylene glycol monomethyl ether, methyl cellosolve, ethyl cellosolve, butyl cellosolve, isopropyl cellosolve, acetylacetone, methyl isobutyl ketone, n-butyl acetate, cellosolve acetate, toluene, xylene, or the like, alone or in combination.

Application of the slurry may be carried out continuously or discontinuously by using various methods, such as slot die coating, slide coating, curtain coating, or the like. After applying the slurry onto the current collector, the solvent is dried finally to provide a negative electrode including the current collector coated with the negative electrode active material layer.

Herein, the negative electrode active material layer has a packing density of 1-2, preferably 1.55-1.65, more preferably 1.575-1.625, and more preferably 1.59-1.62.

This results from the use of conventional artificial graphite, which shows poor rolling property in the manufacture of an electrode due to the removal of internal pores during powder graphitization but has a large particle diameter, in combination with natural graphite having a small particle diameter. It is possible to provide a battery having high capacity by virtue of excellent packing density.

In still another aspect, there is provided a secondary battery including a positive electrode, the above-described negative electrode and a separator interposed between the positive electrode and the negative electrode.

The positive electrode that may be used according to an embodiment of the present disclosure is not particularly limited, as long as it is used conventionally in the art. The positive electrode may include a positive active material layer coated on a positive electrode current collector.

Non-limiting examples of the positive electrode current collector include stainless steel, aluminum, nickel, titanium, baked carbon or copper; aluminum or stainless steel surface-treated with carbon, nickel, titanium or silver; or the like.

In addition, the positive electrode active material layer may further include a positive electrode active material, conductive material, dispersant, filler, or the like.

The positive electrode active material is not particularly limited, as long as it is used conventionally in the art. Non-limiting examples of the positive electrode active material include lithium-containing transition metal oxides, and particular examples thereof include any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0<y<1$), $Li_xNi_{1-y}Mn_yO_2$ ($0.5<x<1.3$, $0<y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$), or a combination of two or more of them. In addition, the lithium-containing transition metal oxides may be coated with a metal, such as aluminum (Al), or metal oxide. Further, sulfides, selenides and halides may also be used, in addition to the lithium-containing transition metal oxides.

The binder, conductive material and dispersant contained in the positive electrode active material layer may be the same as the binder, conductive material and dispersant used for the above-described negative electrode active material layer, and detailed description thereof will be omitted to avoid repeated description. However, it is to be understood that any binders, conductive materials and dispersants used for the negative electrode active material layer may be used.

The separator that may be used herein is not particularly limited, as long as it is material and has a shape used for preventing short-circuit between a positive electrode and a negative electrode in the art. A non-limiting example of the separator may include a porous substrate and a porous coating layer formed on either surface or both surfaces of the porous substrate and containing inorganic particles and a binder polymer.

Herein, the porous substrate may include a porous polymer film substrate or porous polymer nonwoven web substrate. For example, the porous polymer film substrate may be a porous polymer film including polyolefin, such as polyethylene or polypropylene. Such a polyolefin porous polymer film substrate may realize a shut-down function at a temperature of 80-130° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film may be obtained by molding various polymers, such as polyesters, other than polyolefins, into a film shape. Further, the porous polymer film may have a stacked structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins In addition, there is no particular limitation in the thickness of the porous substrate, and the porous substrate preferably has a thickness of 5-50 μm. The size of the pores present in the porous substrate may be smaller than the size of the binder polymer fibers of the electrode adhesive layer and preferably is 0.01-50 μm. Preferably, the porosity is 0.1-99%.

The porous coating layer may include inorganic particles and a binder polymer, and the inorganic particles are bound with each other by the binder polymer while they are packed and in contact with each other. Thus, interstitial volumes are formed among the inorganic particles and the interstitial volumes among the inorganic particles become vacant spaces, thereby forming pores.

In other words, the binder polymer attaches the inorganic particles to each other so that they may maintain an interconnected state. For example, the binder polymer connects and fixes the inorganic particles to each other. In addition, according to an embodiment, the pores of the porous coating layer are those formed by conversion of the interstitial volumes among the inorganic particles into vacant spaces. Such spaces are defined by the inorganic particles that are in contact with each other substantially in a closed packed or densely packed structure of the inorganic particles. Through the pores of the porous coating layer, it is possible to provide lithium ion channel essential for driving a battery.

In addition, to form a packed structure of inorganic particles forming the above-mentioned porous structure derived from interstitial volumes, it is preferred that the weight ratio of the inorganic particles and the binder polymer contained in the porous coating layer ranges from 50:50 to 99:1, more preferably from 70:30 to 95:5. The content of inorganic particles of 50:50 or more contributes to the thermal stability of a separator. Formation of the interstitial volumes among the inorganic particles can contribute to ensuring the porosity and pore size of the porous coating layer. When the content of the inorganic particles exceeds 99 parts by weight, peeling resistance of the porous coating layer may be decreased undesirably due to a relatively low content of the binder polymer.

In addition, the above-described secondary battery may be a lithium secondary battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1-1

GT available from Zichen Co. was used as artificial graphite and AGP8 available from BTR Co. was used as natural graphite to carry out a test. GT had an average particle diameter of 23 μm and AGP8 had an average particle diameter of 11 μm, and GT was mixed with AGP8 at a weight ratio of 3:7. Then, 2 parts by weight of amorphous carbon was coated thereon based on 100 parts by weight of the sum of artificial graphite and natural graphite to obtain a negative electrode active material.

Example 1-2

A negative electrode active material was obtained in the same manner as Example 1-1, except that the amount of amorphous carbon used for coating was 5 parts by weight.

Example 1-3

A negative electrode active material was obtained in the same manner as Example 1-1, except that the amount of amorphous carbon used for coating was 1 part by weight.

Example 1-4

A negative electrode active material was obtained in the same manner as Example 1-1, except that the amount of amorphous carbon used for coating was 10 parts by weight.

Example 1-5

A negative electrode active material was obtained in the same manner as Example 1-1, except that the weight ratio of artificial graphite and natural graphite was 1:9.

Example 1-6

A negative electrode active material was obtained in the same manner as Example 1-1, except that the weight ratio of artificial graphite and natural graphite was 4:6.

Comparative Example 1-1

GT available from Zichen Co. was used as artificial graphite and AGP8 available from BTR Co. was used as natural graphite to carry out a test. GT had an average particle diameter of 23 μm and AGP8 had an average particle diameter of 11 μm, and GT was mixed with AGP8 at a weight ratio of 3:7 to obtain a negative electrode active material.

Comparative Example 1-2

A negative electrode active material was obtained in the same manner as Example 1-1, except that only the artificial graphite having a large particle diameter was coated with amorphous carbon and the amount of amorphous carbon used for coating was 2 parts by weight based on 100 parts by weight of artificial graphite.

Comparative Example 1-3

A negative electrode active material was obtained in the same manner as Example 1-1, except that only the natural graphite having a small particle diameter was coated with amorphous carbon and the amount of amorphous carbon used for coating was 2 parts by weight based on 100 parts by weight of natural graphite.

Comparative Example 1-4

A negative electrode active material was obtained in the same manner as Example 1-1, except that the amount of amorphous carbon used for coating was 0.5 parts by weight.

Comparative Example 1-5

A negative electrode active material was obtained in the same manner as Example 1-1, except that the amount of amorphous carbon used for coating was 10.5 parts by weight.

Comparative Example 1-6

A negative electrode active material was obtained in the same manner as Example 1-1, except that the weight ratio of artificial graphite and natural graphite was 0.5:9.5.

Comparative Example 1-7

A negative electrode active material was obtained in the same manner as Example 1-1, except that the weight ratio of artificial graphite and natural graphite was 5:5.

Example 2-1

Manufacture of Negative Electrode

First, 96 parts by weight of the negative electrode active material according to Example 1-1, 1 part by weight of carboxymethyl cellulose (CMC) and 2 parts by weight of styrene butadiene rubber (SBR) as binders and 1 part by weight of carbon black as a conductive material were added to tertiary distilled water to obtain negative electrode mixture slurry. Next, the negative electrode mixture slurry was applied to both surfaces of copper (Cu) thin film (thickness: 10 μm) as a negative electrode current collector, followed by drying. Then, roll pressing was carried out to obtain a negative electrode.

Manufacture of Positive Electrode

First, 92 parts by weight of a positive electrode active material containing $LiMn_{1/3}Ni_{1/3}Co_{1/3}O_2$ having an average diameter of 2 μm and $LiMn_{1/3}Ni_{1/3}Co_{1/3}O_2$ having an average diameter of 20 μm mixed at a weight ratio of 1:3, 4 parts by weight of carbon black as a conductive material and 4 parts by weight of polyvinylidene fluoride (PVDF) as a binder were added to N-methyl-2-pyrrolidone (NMP) as a solvent to obtain positive electrode mixture slurry. Next, the positive electrode mixture slurry was applied to both surfaces of aluminum (Al) thin film (thickness: 20 μm) as a positive electrode current collector, followed by drying. Then, roll pressing was carried out to obtain a positive electrode.

Manufacture of Separator

First, polyvinylidene fluoride (PVDF) and epoxy were dissolved in acetone to obtain a binder polymer solution. To the resultant binder polymer solution, alumina ($Al_2O_3$) was added so that the weight ratio of polyvinylidene fluoride/alumina ($Al_2O_3$) may be 7.15/92.5. Next, alumina ($Al_2O_3$) was pulverized and dispersed by using a ball mill process for 3 hours to obtain slurry. Although the particle diameter of alumina ($Al_2O_3$) in the resultant slurry may be controlled depending on the size (particle size) of beads used for milling and ball milling time, alumina ($Al_2O_3$) was pulverized into a size of about 400 mm in this test, thereby providing slurry. Then, the resultant slurry was coated onto one surface of a polyethylene porous polymer film (porosity 45%) having a thickness of 12 μm, followed by drying.

Manufacture of Battery

The negative electrode, positive electrode and the separator obtained as described above were stacked in the order of positive electrode/separator/negative electrode/separator/positive electrode and pressure was applied to the stacked structure at high temperature to obtain a bi-cell. The obtained 21 unit bi-cells were arranged on one surface of a separator and then folded to obtain an electrode assembly. Then, electrolyte containing 1M lithium hexafluorophosphate ($LiPF_6$) dissolved in ethylene carbonate and ethylmethyl carbonate (EC/EMC=1:2, volume ratio) was injected thereto, thereby providing a lithium secondary battery.

Example 2-2

A battery was obtained in the same manner as Example 2-1, except that the negative electrode active material according to Example 1-2 was used.

Example 2-3

A battery was obtained in the same manner as Example 2-1, except that the negative electrode active material according to Example 1-3 was used.

Example 2-4

A battery was obtained in the same manner as Example 2-1, except that the negative electrode active material according to Example 1-4 was used.

Example 2-5

A battery was obtained in the same manner as Example 2-1, except that the negative electrode active material according to Example 1-5 was used.

Example 2-6

A battery was obtained in the same manner as Example 2-1, except that the negative electrode active material according to Example 1-6 was used.

Comparative Example 2-1

A battery was obtained in the same manner as Example 2-1, except that the negative electrode active material according to Comparative Example 1-1 was used.

Comparative Example 2-2

A battery was obtained in the same manner as Example 2-1, except that the negative electrode active material according to Comparative Example 1-2 was used.

Comparative Example 2-3

A battery was obtained in the same manner as Example 2-1, except that the negative electrode active material according to Comparative Example 1-3 was used.

Comparative Example 2-4

A battery was obtained in the same manner as Example 2-1, except that the negative electrode active material according to Comparative Example 1-4 was used.

Comparative Example 2-5

A battery was obtained in the same manner as Example 2-1, except that the negative electrode active material according to Comparative Example 1-5 was used.

Comparative Example 2-6

A battery was obtained in the same manner as Example 2-1, except that the negative electrode active material according to Comparative Example 1-6 was used.

Comparative Example 2-7

A battery was obtained in the same manner as Example 2-1, except that the negative electrode active material according to Comparative Example 1-7 was used.

Evaluation of Performance

Charge Transfer Resistance (FIG. 1)

After setting a state-of-charge (SOC) at 50%, electrochemical impedance spectroscopy (EIS) was used to measure the charge transfer resistance value of each of Example 2-1 and Comparative Examples 2-1 to 2-3 under the conditions of an amplitude of 10 mV and a frequency ranging from 100 kHz to 50 mHz. The results are shown in FIG. 1.

In the case of Example 2-1 using the negative electrode active material in which both artificial graphite having a large particle diameter and natural graphite having a small particle diameter were coated, the charge transfer resistance was reduced significantly in the EIS measurement.

On the contrary, Comparative Example 2-1, in which none of artificial graphite having a large particle diameter and natural graphite having a small particle diameter were not coated, shows the highest resistance. It is shown that Example 2-1 coated with both types of graphite is more effective for reducing resistance, as compared to Comparative Examples 2-2 and 2-3 coated with either of artificial graphite having a large particle diameter and natural graphite having a small particle diameter.

Figure 2:
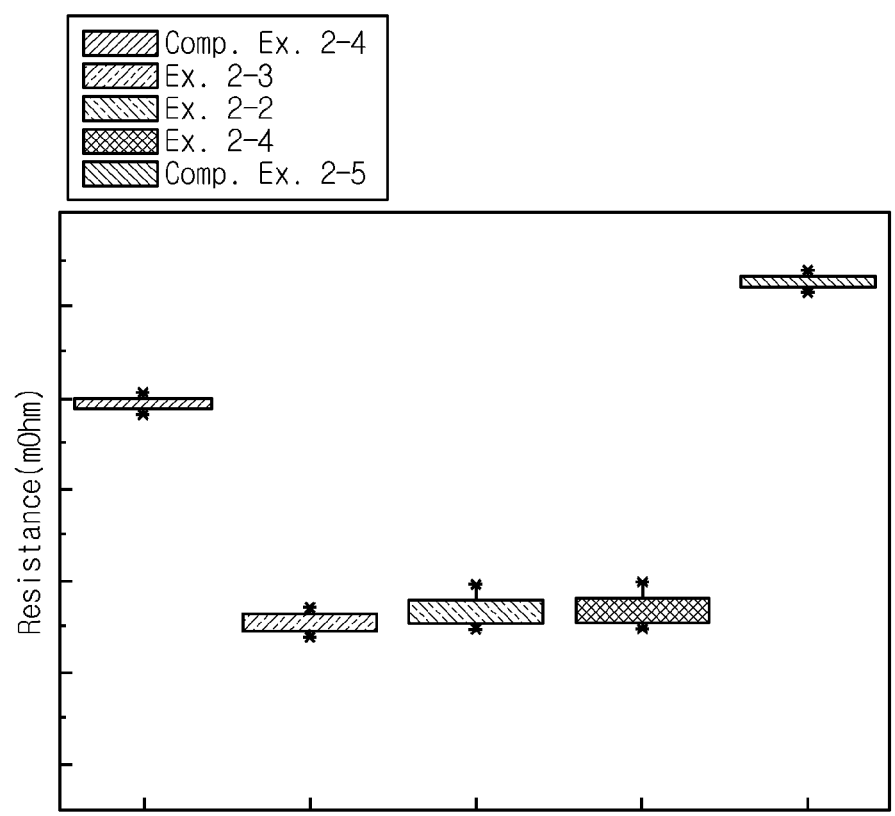
FIG. 2 is a graph illustrating the results of comparison of resistance in Examples 2-2 to 2-4 with Comparative Example 2-4 and 2-5, as a function of surface coating amount.

Resistance Depending on Surface Coating Amount (FIG. 2)

After setting a SOC at 50%, current of 2.5 C was applied for 30 seconds to cause variations in voltage. The resistance of each of Examples 2-2, 2-3 and 2-4 and Comparative Examples 2-4 and 2-5 was determined. The results are shown in FIG. 2.

Examples 2-3, 2-2 and 2-4, in which the amount of a coating layer containing amorphous carbon is 1, 5 and 10 parts by weight, respectively, based on 100 parts by weight of the sum of artificial graphite having a large particle diameter and natural graphite having a small particle diameter, were effective for reducing resistance.

It can be seen that Comparative Example 2-4, in which the amount of the amorphous carbon coating layer is 0.5 parts by weight less than 1 part by weight, and Comparative Example 2-5, in which the amount of the amorphous carbon coating layer is 10.5 parts by weight more than 10 parts by weight, showed a significant increase in resistance, resulting in a loss of kinetic balance.

When the amorphous carbon layer is present in an amount less than 1 part by weight, it is not possible for amorphous carbon to surround the negative electrode surface completely, and thus the reactivity with an electrolyte is increased and a thick solid electrolyte interface (SEI) film is formed on the surface, thereby making the transport of lithium ions slow. When the amorphous carbon layer is present in an amount more than 10 parts by weight, the amorphous carbon coating layer is so thick that the distance of lithium ion transport may be increased due to low initial efficiency, resulting in an increase in resistance.

Figure 3:
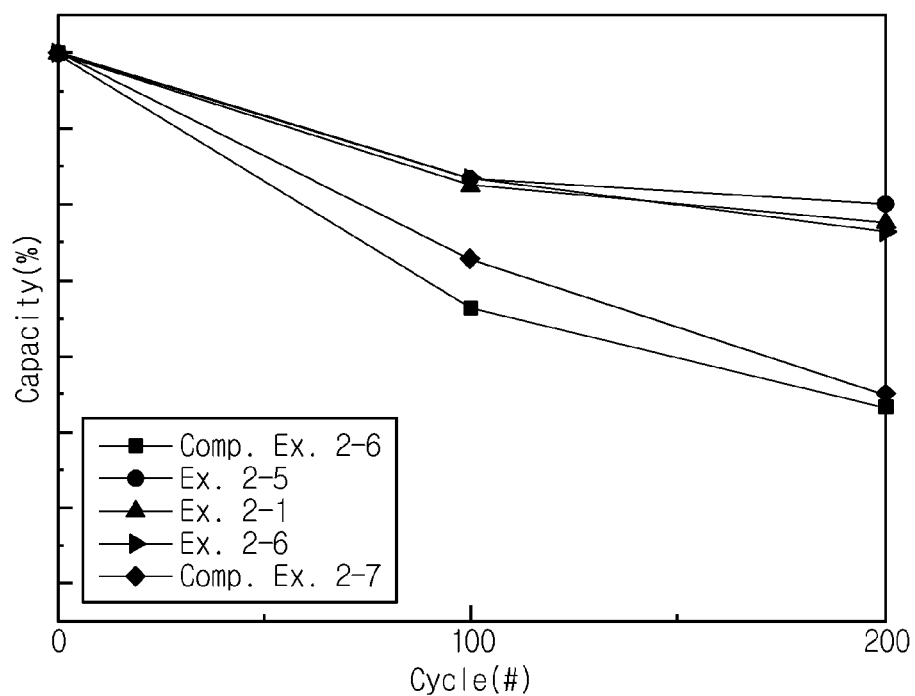
FIG. 3 is a graph illustrating the results of comparison of cycle characteristics in Examples 2-1, 2-5 and 2-6 with Comparative Example 2-6 and 2-7, as a function of ratio of artificial graphite having a large particle diameter and natural graphite having a small particle diameter.

Cycle Characteristics Depending on Ratio of Artificial Graphite Having a Large Particle Diameter and Natural Graphite Having a Small Particle Diameter (FIG. 3)

Each of the batteries according to Examples 2-1, 2-5 and 2-6 and Comparative examples 2-6 and 2-7 was determined for life characteristics at 2 C under the condition of SOC ranging from 0 to 100%. The results are shown in FIG. 3.

When the weight ratio of artificial graphite having a large particle diameter and natural graphite having a small particle diameter is 1:9 (Example 2-5), 3:7 (Example 2-1) and 4:6 (Example 2-6), it is possible to obtain excellent life characteristics while a kinetic balance is retained.

On the contrary, when the weight ratio of artificial graphite having a large particle diameter and natural graphite having a small particle diameter is not within a range of 1:9-4:6, i.e., the weight ratio is 0.5:9.5 (Comparative Example 2-6) and 5:5 (Comparative Example 2-7), degradation of life characteristics occurs while a kinetic balance is lost.

In other words, when the weight ratio is not within a range of 1:9-4:6, there is a significant difference between the rate of lithium ion intercalation and the rate of lithium ion transport in graphite particles, thereby accelerating degradation of life characteristics. When the weight ratio is smaller than 1:9 (the proportion of artificial graphite having a large particle diameter is less than 1), the rate of lithium ion intercalation is high but the rate of lithium ion transport in graphite particles is low, thereby accelerating deposition of lithium. When the weight ratio is larger than 4:6 (the proportion of artificial graphite having a large particle diameter exceeds 4), the rate of lithium ion intercalation cannot keep up with the rate of lithium ion transport in graphite particles to generate a significant gradient in lithium ion concentration, thereby accelerating degradation of life characteristics.

The present disclosure has been described in detail with reference to particular embodiments and drawings, but it should be understood that the scope of the present disclosure is not limited thereto. It should be also understood that various changes and modifications within the scope of the disclosure will become apparent to those skilled in the art from this detailed description.

What is claimed is:

1. A negative electrode active material which comprises artificial graphite having a large particle diameter and natural graphite having a small particle diameter,
   wherein an average particle diameter ratio of the small particle and the large particle is 1:1.5-1:5;
   each of the artificial graphite having a large particle diameter and the natural graphite having a small particle diameter is further provided with a coating layer containing amorphous carbon;
   the coating layer is present in an amount of 1-10 parts by weight based on 100 parts by weight of a sum of the artificial graphite having a large particle diameter and the natural graphite having a small particle diameter; and
   a content ratio of the artificial graphite having a large particle diameter and the natural graphite having a small particle diameter is 1:9-4:6.

2. The negative electrode active material according to claim 1, wherein the artificial graphite has an average particle diameter of 18-30 μm.

3. The negative electrode active material according to claim 1, wherein the natural graphite has an average particle diameter of 5-13 μm.

4. A negative electrode comprising a current collector, and a negative electrode active material layer formed on at least one surface of the current collector and comprising the negative electrode active material as defined in claim 1.

5. The negative electrode according to claim 4, wherein the negative electrode active material layer further comprises at least one of a binder, conductive material and a dispersant.

6. A secondary battery comprising a positive electrode, the negative electrode as defined in claim 4, and a separator interposed between the positive electrode and the negative electrode.

7. A secondary battery according to claim 6, which is a lithium secondary battery.

* * * * *